United States Patent
Noh et al.

(10) Patent No.: US 6,324,116 B1
(45) Date of Patent: Nov. 27, 2001

(54) MERGED SEMICONDUCTOR DEVICE HAVING DRAM AND SRAM AND DATA TRANSFERRING METHOD USING THE SEMICONDUCTOR DEVICE

(75) Inventors: Mi-jung Noh, Yongin; Jeong-seok Lee, Seongnam, both of (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/595,747

(22) Filed: Jun. 16, 2000

(30) Foreign Application Priority Data

Jun. 18, 1999 (KR) .................................................. 99-22920

(51) Int. Cl.$^7$ ....................................................... G11C 8/00
(52) U.S. Cl. ................ 365/230.05; 365/220; 365/230.03
(58) Field of Search ......................... 365/230.03, 230.05, 365/189.04, 220, 221

(56) References Cited

U.S. PATENT DOCUMENTS 6,072,741 * 6/2000 Taylor .................................... 365/219
6,088,760 * 7/2000 Walker et al. ........................ 711/104

FOREIGN PATENT DOCUMENTS 10-326486   12/1998   (JP) .
10-326491   12/1998   (JP) .

OTHER PUBLICATIONS

Patent Abstract of Japan JP10326491 Supplied from the *esp@cenet* Database.
Patent Abstract of Japan JP 10326486 Supplied from the *esp@cenet* Database.

* cited by examiner

*Primary Examiner*—Amir Zarabian
*Assistant Examiner*—Hien Nguyen
(74) *Attorney, Agent, or Firm*—Skjerven Morrill MacPherson LLP; David W. Heid

(57) ABSTRACT

A merged semiconductor device having a DRAM and an SRAM, and a data transmitting method using the same are provided. In this device, the DRAM acts as a main memory, and the SRAM acts as a cache memory. The reading operation of the DRAM, and the writing operation of the SRAM are simultaneously controlled by a DRAM read control signal. Also, the writing operation of the DRAM, and the reading operation of the SRAM are simultaneously controlled by a DRAM write control signal. In this device, DRAM write commands and DRAM read commands can be continuously given. Writing of the SRAM starts after reading of the DRAM is completed, and writing of the DRAM starts after reading of the SRAM is completed.

6 Claims, 6 Drawing Sheets

MERGED SEMICONDUCTOR DEVICE HAVING DRAM AND SRAM AND DATA TRANSFERRING METHOD USING THE SEMICONDUCTOR DEVICE

BACKGROUND OF THE INVENTION

1. Field of the Invention

The present invention relates to semiconductor devices, and more particularly, to a semiconductor memory device which includes a cache memory. A DRAM having a large storage capacity is used as a main memory, and an SRAM having a smaller storage capacity is used as the cache memory and both are provided on a semiconductor chip. The present invention also relates to a data transferring method for the semiconductor device.

2. Description of the Related Art

Generally, a data processing system uses a typical DRAM having a large storage capacity to reduce the cost of the system. However, recently, the operating speed of microprocessing units (MPU) has increased to 250 Mhz or greater. Although the operating speed of DRAMs has significantly increased, their operating speed is much less than the operating speed of today's MPU. Research has been performed in different areas attempting to solve the reduction in operating speed of a data processing system due to the difference in operating speed between the associated DRAM and an MPU. One solution is to use a merged memory with logic (MML) in which a DRAM together with a logic circuit are provided on a chip. A further proposed solution involves installing a DRAM, an SRAM which is a cache memory, and a logic circuit on a single chip. In this latter proposed solution, in which a DRAM, an SRAM and a logic circuit are installed on a chip, a circuit is required for effectively transferring data between the SRAM and the DRAM. However, up to now, no method for effectively transferring data between an SRAM and a DRAM has been developed.

SUMMARY OF THE INVENTION

In accordance with the present inventions, a semiconductor device is provided which effectively transmits data between a DRAM and an SRAM which are included on a same chip.

In accordance with another aspect of the present invention, a method is provided for effectively transmitting data between a DRAM and an SRAM.

According to one embodiment of the present invention, a semiconductor device is provided which includes a first memory cell array having a plurality of memory cells, and a second separate memory cell array having a plurality of memory cells, the semiconductor device including first circuitry responsive to a first control signal to simultaneously perform a reading operation of the first memory cell array and a writing operation of the second memory cell array, and the semiconductor device includes second circuitry responsive to a second control signal to simultaneously perform a writing operation of the first memory cell array and a reading operation of the second memory cell array.

According to another aspect of the present invention in the immediately preceding embodiment, the first memory cell array is comprised of a dynamic random access memory (DRAM), and the second memory cell array is comprised of a static random access memory (SRAM).

In another embodiment of the present invention, a semiconductor device is provided which includes a DRAM having a plurality of first memory cells which are arranged in rows and columns, a pair of input and output lines for transferring data in a selected one of the first memory cells, an input and output sense amplifier coupled to the pair of input and output lines for amplifying data on pair of input and output lines in a first mode, and a write driver for driving received data to the pair of input and output lines in a second mode; and an SRAM comprising a plurality of second memory cells which are arranged in rows and columns, a write bit line for transferring data output from the DRAM in the first mode, a write word line for controlling the data on the write bit line to be transmitted to a selected one of the second memory cells in the first mode, a read word line for controlling data to be read from the selected second memory cell in the second mode, and a read bit line for transmitting the data read from the second memory cell to the DRAM. In this embodiment, wherein the reading operation of the DRAM and the writing operation of the SRAM are simultaneously controlled by a first control signal in the first mode, and the reading operation of the SRAM and the writing operation of the DRAM are simultaneously controlled by a second control signal.

In a further embodiment of the present invention, a method is provided for transferring data in a semiconductor device which includes a DRAM and an SRAM. In the method, the semiconductor device includes a DRAM having a plurality of first memory cells which are arranged in rows and columns, a pair of input and output lines for transferring data in a selected one of the first memory cells, and an input and output sense amplifier coupled to the pair of input and output lines for amplifying data on the pair of input and output lines in a first mode; and an SRAM comprising a plurality of second memory cells which are arranged in rows and columns, a write bit line for transferring data which is output from the DRAM, in the first mode, and a write word line for controlling the data on the write bit line to be transferred to a selected one of the second memory cells in the first mode. The method comprises: (a) generating an internal clock signal in a synchronization with an external clock signal; (b) precharging the input and output lines to the same voltage level, in synchronization with the internal clock signal; (c) transferring the data on a selected first memory cell to the precharged input and output lines; (d) sensing and amplifying the data transferred from the first memory cell by enabling the input and output sense amplifier; (e) outputting the amplified data from the DRAM; (f) providing a logic unit operative in response to receipt of the internal clock signal and latency information to produce an output signal; (g) generating a DRAM read control signal by delaying an output signal from said logic unit for a predetermined delay time with respect to the internal clock signal when a CAS latency is less than or equal to a predetermined length; and (h) writing data in the second memory cells in response to the DRAM read control signal and activation of the write word line of the SRAM in the second mode.

According to another embodiment, a further method is provided for transferring data in an semiconductor device which includes a DRAM and an SRAM. In this embodiment, the semiconductor device includes a DRAM having a plurality of first memory cells which are arranged in rows and columns, a pair of input and output lines, and a write driver for driving received data to the pair of input and output lines in a second mode; and an SRAM having a plurality of second memory cells which are arranged in rows and columns, a read word line for controlling data to be read from a selected second memory cell in the second mode, and a read bit line for transferring data which is read from the selected second memory cell to the DRAM. The method comprises: (a) generating an internal clock signal in a synchronization with an external clock signal; (b) generating in synchronization with the internal clock signal a DRAM write control signal for controlling the read word line of the SRAM; (c) activating the read word line of the SRAM in response to the DRAM write control signal; (d) outputting data from the SRAM; (e) generating a predetermined write signal in synchronization with the internal clock signal; and (f) storing data which is output from the SRAM in a selected one of the first memory cells via the pair of input and output lines in response to the write signal.

BRIEF DESCRIPTION OF THE DRAWINGS

The above advantages, construction and operation of the present invention will become more apparent by reference to the description provided below in conjunction with reference to the drawings in which.

DESCRIPTION OF THE PREFERRED EMBODIMENT

Figure 1:
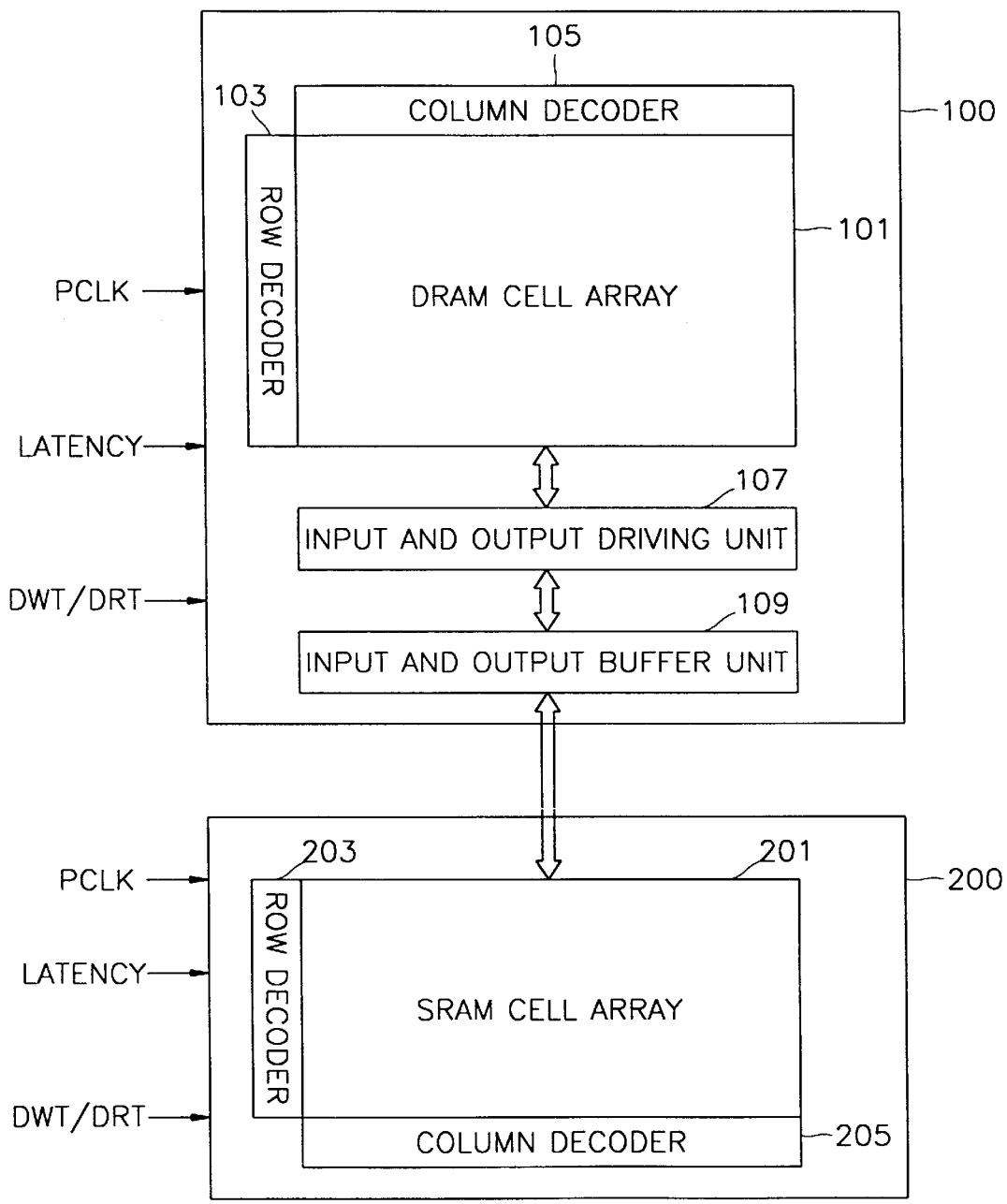
FIG. 1 is a block diagram schematically illustrating a merged semiconductor device having a DRAM and an SRAM according to an embodiment of the present invention.

The drawings illustrate a preferred embodiment of the present invention, and provide, in conjunction with the written description which follows, an understanding of the merits and operation of the present invention.

Hereinafter, the present invention will be described in detail by explaining a preferred embodiment of the present invention with reference to the drawings. Like reference numerals in the drawings denote the same element.

Referring to FIG. 1, a merged semiconductor device having a DRAM and an SRAM according to an embodiment of the present invention is obtained by providing DRAM 100 and SRAM 200 on a semiconductor chip. In a read operation, a memory cell from among a plurality of memory cells which are arranged in the rows and columns in a DRAM cell array 101 is selected by a row decoder 103 and a column decoder 105. Data of the selected memory cell is output via an input and output driving unit 107 and an input and output buffer unit 109. Data which is received from DRAM 100 via the input and output buffer unit 109 is stored in the selected memory cell via the input and output driving unit 107. Data which is output from the DRAM 100 is supplied to the SRAM 200. Data provided to SRAM 200 is stored in a memory cell of SRAM cell array 201 which is selected by row decoder 203 and column decoder 205 of SRAM 200. The SRAM cell array 201 includes a plurality of memory cells which are arranged in the rows and columns therein. Data which is output from SRAM 200 can be received by DRAM 100.

That is, data can be substantially exchanged between DRAM 100 and SRAM 200. An external DRAM write command (DRAM write transfer: DWT) and an external DRAM read command (DRAM read transfer: DRT) are used to instruct data transfer between the DRAM 100 and the SRAM 200. The DRAM write command DWT instructs the writing of data from SRAM 200 to DRAM 100. The DRAM read command DRT instructs the writing of data from the DRAM 100 to SRAM 200.

Figure 2:
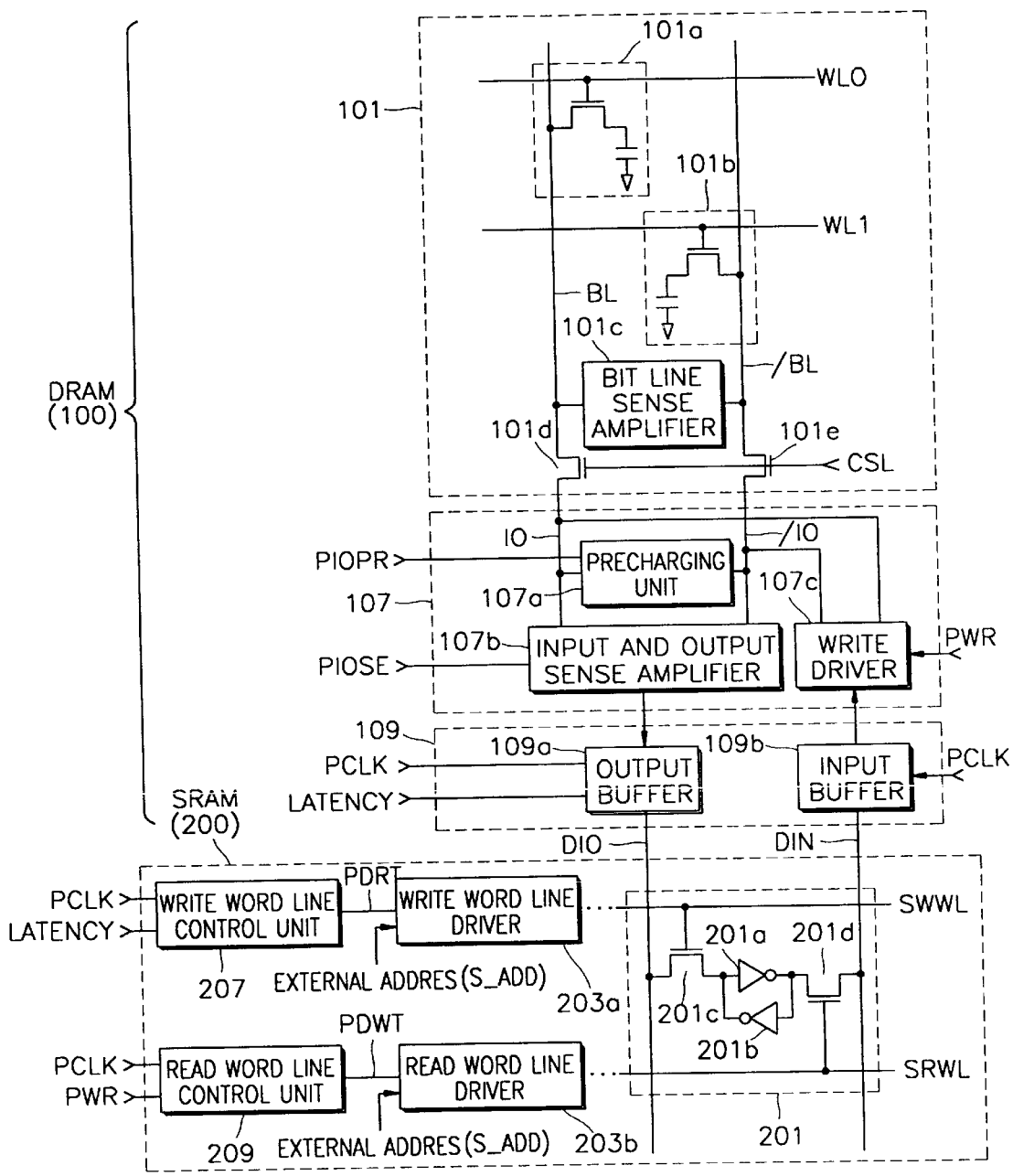
FIG. 2 is a block diagram illustrating an embodiment of the semiconductor device of FIG. 1 in more detail.

FIG. 2 shows the semiconductor device of FIG. 1 in more detail. An internal clock signal PCLK is generated using an external clock signal ECLK which is applied to the semiconductor device. Several circuits within the semiconductor device are controlled by the internal clock signal PCLK.

The DRAM cell array 101 includes a plurality of memory cells, bit lines, a bit line sense amplifier 101c, and input and output switches 101d and 101e. To simplify the explanation, only a pair of memory cells 101a and 101b, a pair of bit lines BL and /BL, a bit line sense amplifier 101c, and input and output switches 101d and 101e are shown.

Input and output driving unit 107 includes a pair of input and output lines IO and /IO, a precharging unit 107a, an input and output sense amplifier 107b, and a write driver 107c. The pair of input and output lines IO and /IO exchange data with the bit lines BL and /BL, respectively, via the input and output switches 101d and 101e. The precharging unit 107a precharges the pair of input and output lines IO and /IO to the same voltage in response to a precharging signal PIOPR.

The input and output sense amplifier 107b senses and amplifies data of the bit lines BL and /BL which are received via the input and output switches 101d and 101e. The input and output sense amplifier 107b is controlled by a sense amplification enable signal PIOSE.

The write driver 107c drives data received by the DRAM 100 to the pair of input and output lines IO and /IO. The write driver 107c is enabled in response to a write instruction signal PWR which represents the generation of a DRAM write command.

The input and output buffer unit 109 includes an output buffer 109a and an input buffer 109b. The output buffer 109a outputs data which has been amplified by the input and output sense amplifier 107b, to the outside, and is controlled by latency information LATENCY. The input buffer 109b buffers data received from the SRAM 200, and transmits the received data to the write driver 107c.

The SRAM 200 includes a plurality of memory cells which are arranged in the rows and columns therein. For convenience of illustration, only a memory cell 201 is shown. The memory cell 201 in the SRAM 200 includes a main inverter 201a, an auxiliary inverter 201b, a write transistor 201c, and a read transistor 201d. The main inverter 201a and the auxiliary inverter 201b form a latch unit.

Data output from the DRAM 100 is applied to the SRAM 200 via a data output line DIO. When SRAM write word line SWWL of the SRAM 200 is activated, data received on output line DIO is stored in inverters 201a and 201b (which perform a latch function) via the write transistor 201c. When SRAM read word line SRWL of the SRAM 200 is activated, data stored in inverters 201a and 201b is applied to data input line DIN of the DRAM via the read transistor 201d.

The SRAM write word line SWWL is controlled by a write word line control unit 207 and a write word line driver 203a. The write word line control unit 207 receives an internal clock signal PCLK and the latency information LATENCY, and generates a DRAM read control signal PDRT which is activated when data is read from the DRAM. The circuit of write word line control unit 207 will be described in detail later, with reference to FIG. 3.

The write word line driver 203a activates the SRAM write word line SWWL of the SRAM 200 which is selected by an SRAM external address S_ADD, in response to the activation of the DRAM read control signal PDRT.

The SRAM read word line SRWL is controlled by a read word line control unit 209 and a read word line driver 203b. The read word line control unit 209 receives the internal clock signal PCLK and a write instruction signal PWR including a DRAM write command, and generates a DRAM write control signal PDWT which is activated when data is to be written in the DRAM. The configuration of the read word line control unit 209 will be described in detail later, with reference to FIG. 4.

Figure 3:
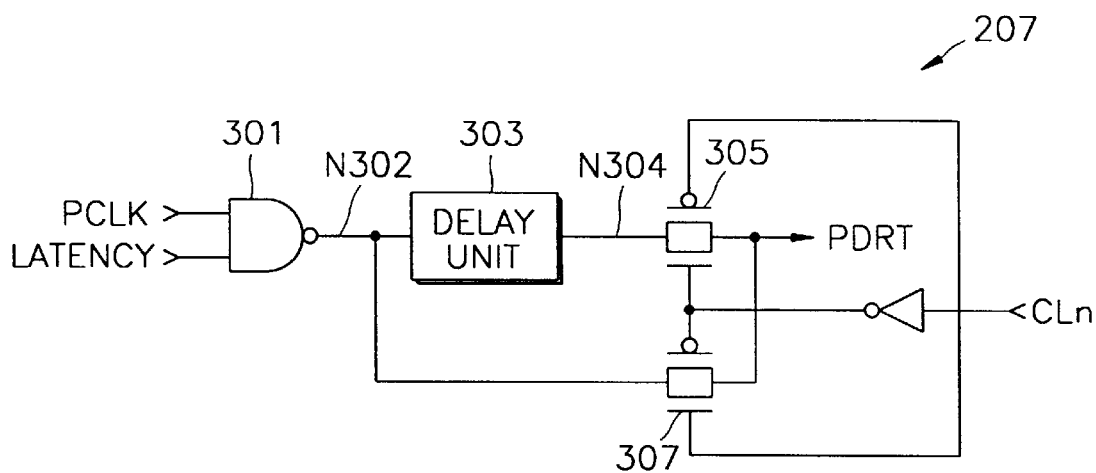
FIG. 3 is a circuit diagram illustrating an embodiment of the write word line control unit of FIG. 2 in more detail.

FIG. 3 is a circuit diagram illustrating an embodiment of the write word line control unit 207 of FIG. 2 in more detail. The write word line control unit 207 includes a logic unit 301 a delay unit 303, and two transfer units 305 and 307. The logic unit 301 logically operates in response to the internal clock signal PCLK and the latency information LATENCY. According to a preferred embodiment, the logic unit 301 is realized with a NAND gate.

The delay unit 303 delays the output signal N302 from the logic unit 301 for a predetermined delay time. The transfer units 305 and 307 transfer the output signal N304 of the delay unit 303 and the output signal N302 of the logic unit 301, respectively, in response to a CAS latency signal CLn. That is, the transfer unit 305 is turned on when CAS latency is less than or equal to a reference length, and transfers the output signal N304 of the delay unit 303 as the DRAM read control signal PDRT. The transfer unit 307 is turned on when CAS latency is greater than the reference length, and transfers the output signal N302 from the logic unit 301 as the DRAM read control signal PDRT. In this specification, each of the delay unit 303 and the transfer units 305 and 307 are realized with a DRAM read control signal generator.

For the purpose of explanation herein, the reference length of CAS latency is set to be 2. The CAS latency signal CLn is activated when the CAS latency is greater than 2, and deactivated when the CAS latency is less than or equal to 2. Also, according to a preferred embodiment, the transfer units 305 and 307 are realized with transfer gates.

Figure 4:
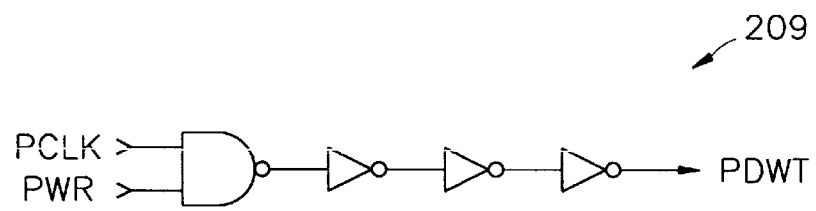
FIG. 4 is a circuit diagram illustrating an embodiment of the read word line control unit of FIG. 2 in more detail.

FIG. 4 is a circuit diagram illustrating an embodiment of the read word line control unit 209 of FIG. 2 in more detail. The read word line control unit 209 receives the internal clock signal PCLK and the write instruction signal PWR, and generates the DRAM write control signal PDWT which is activated in a mode of writing data in a DRAM.

Figure 5:
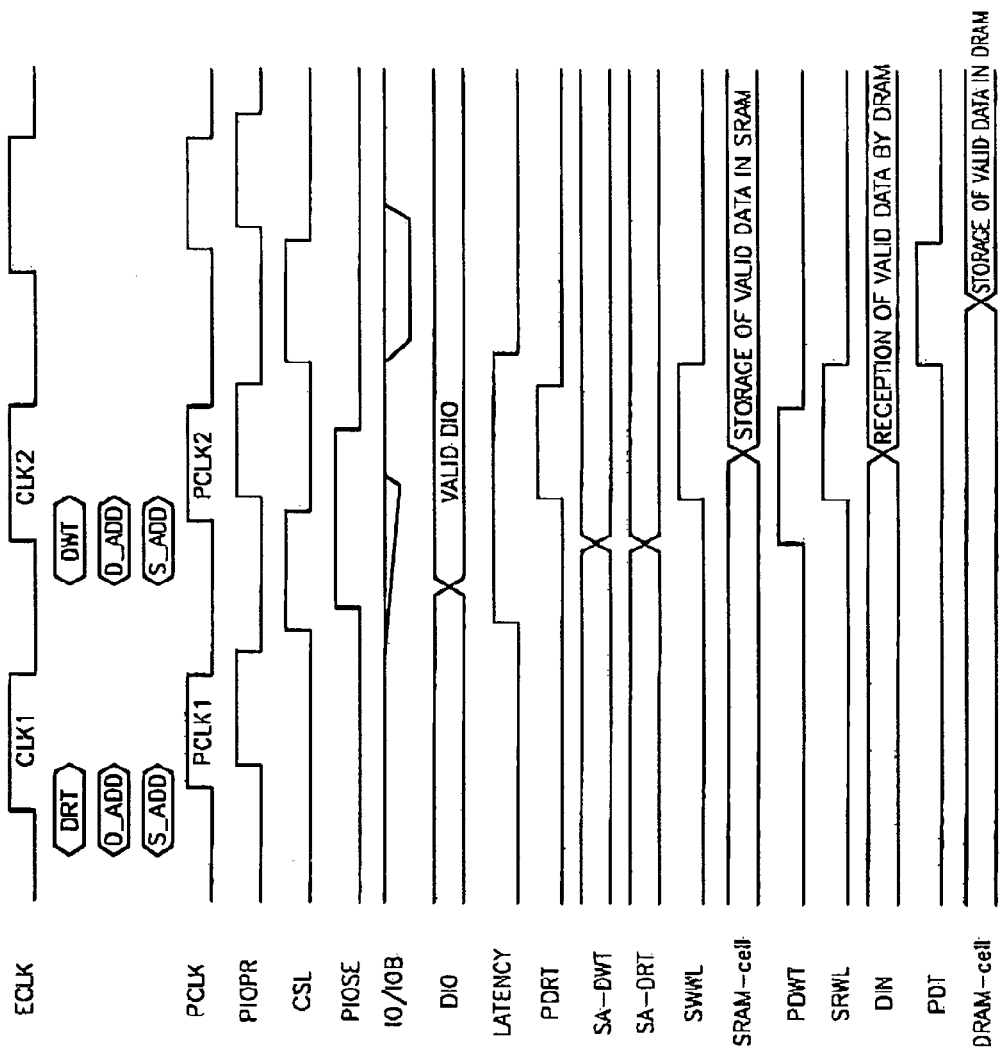
FIG. 5 is a timing diagram of essential terminals of a merged semiconductor device having a DRAM and an SRAM according to the present invention.

FIG. 5 is a timing diagram of essential terminals of a merged semiconductor device having a DRAM and an SRAM according to the present invention. The operations of a semiconductor device according to the present invention in a DRAM read mode and in a DRAM write mode will now be described with reference to FIGS. 1 through 5. In FIG. 5, a case in which the CAS latency is 2 is taken as an example.

First, an internal clock signal PCLK having a regular pulse width is generated in response to the rising edge of an external clock signal ECLK. A DRAM read command DRT is generated, and a DRAM address D-ADD and an SRAM address S-ADD are received at the rising edge of a first external clock signal CLK1. A DRAM write command DWT is generated, and a DRAM address D-ADD and an SRAM address S-ADD are received at the rising edge of a second external clock signal CLK2. A precharging signal PIOPR is activated in synchronization with the internal clock signal PCLK. When the precharging signal PIOPR is activated, a pair of input and output lines IO and /IO in the DRAM are precharged to have the same value. A column selection signal CSL, is delayed for a predetermined period of time with respect to the internal clock signal PCLK. Thus, the column selection signal CSL is activated after the precharging signal PIOPR becomes logic low. In response to the activation of the column selection signal CSL, data which is read from a DRAM memory cell via a pair of bit lines BL and /BL is transferred to the pair of input and output lines IO and /IO. An input and output line enable signal PIOSE is generated in synchronization with the internal clock signal PCLK. When the input and output line enable signal PIOSE is activated, an input and output sense amplifier 107b of FIG. 2 is enabled to amplify the data of the pair of input and output lines IO and /IO. The data of the pair of input and output lines IO and /IO is output from the DRAM via the output buffer 109a (see FIG. 2) in response to the latency information signal LATENCY.

On the SRAM side, a DRAM read control signal PDRT is generated by the latency information signal LATENCY. At this time, the effective data of an SRAM write address SA-DWT for addressing a memory cell into which data is to be written is set up in the SRAM, and the SRAM write word line SWWL, is activated. Therefore, data which is output from the DRAM is written in a memory cell in the SRAM.

When the effective data of the SRAM write address SA_DRT is set up, the effective data of an SRAM read address SA_DWT for addressing a memory cell from which data is to be read is simultaneously set up in the SRAM. A DRAM write control signal PDWT is activated in response to a second internal clock signal PCLK2. Data in a memory cell of the SRAM is output in response to the activation of the DRAM write control signal PDWT and the effective data of the SRAM read address SA_DWT. Data output from the SRAM is applied to the DRAM via the input buffer 109b of the DRAM 100.

As described above, a merged semiconductor device having a DRAM and an SRAM according to an embodiment of the present invention exchanges data using a DRAM read control signal PDRT and a DRAM write control signal PDWT. Thus, on the SRAM side, writing and reading of data can be simultaneously performed.

Figure 6:
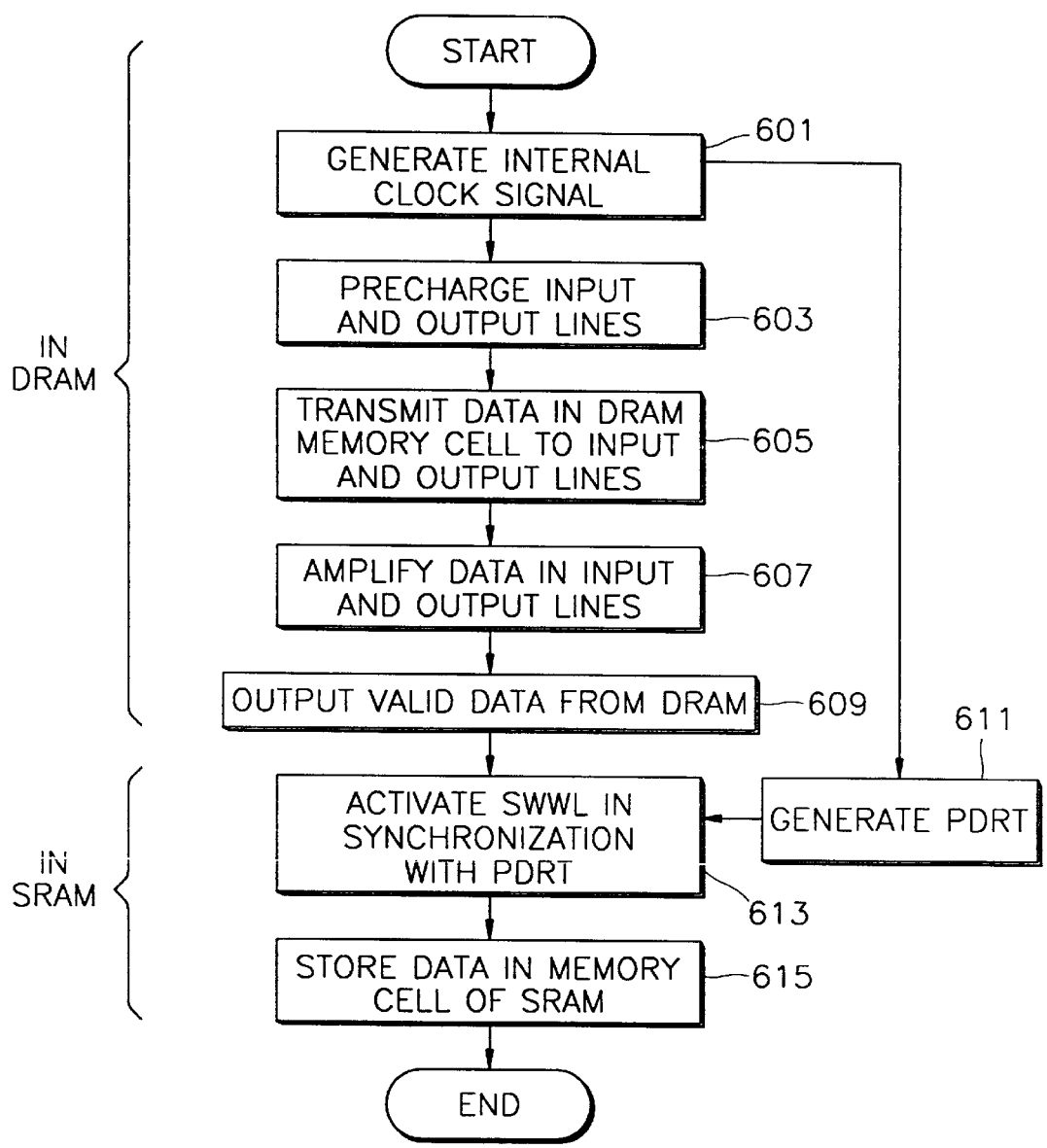
FIG. 6 is a flowchart illustrating a method of performing a DRAM read operation according to an embodiment of the present invention.

FIG. 6 is a flowchart illustrating a method of performing a DRAM read mode according to an embodiment of the present invention, in which data is read from a DRAM and transmitted to an SRAM. Referring to FIG. 6, in the operations of the DRAM and the SRAM in a DRAM read mode, first, an internal clock signal PCLK which synchronizes with an external clock signal ECLK is generated, in step 601. A pair of input and output lines IO and /IO are precharged to have the same voltage level, in response to a precharging signal PIOPR which synchronizes with the internal clock signal PCLK, in step 603. Data in a selected DRAM memory cell is transferred to the precharged input and output lines, in step 605. The input and output sense amplifier 107b is enabled in response to the input and output enable signal PIOSE, and the transmitted data in a first memory cell is sensed and amplifier, in step 607. Amplified data is output from the DRAM, in step 609. Concurrently with the above steps, a DRAM read control signal PDRT is generated in response to the internal clock signal PCLK, in step 611. At this time, in CAS latency having a predetermined length or shorter, the DRAM read control signal PDRT is delayed for a predetermined period of time with respect to the internal clock signal and generated. Then, an SRAM write word line SWWL is activated in response to the DRAM read control signal PDRT, in step 613. Finally, data transmitted from the DRAM is stored in a memory cell in the SRAM, in step 615.

Figure 7:
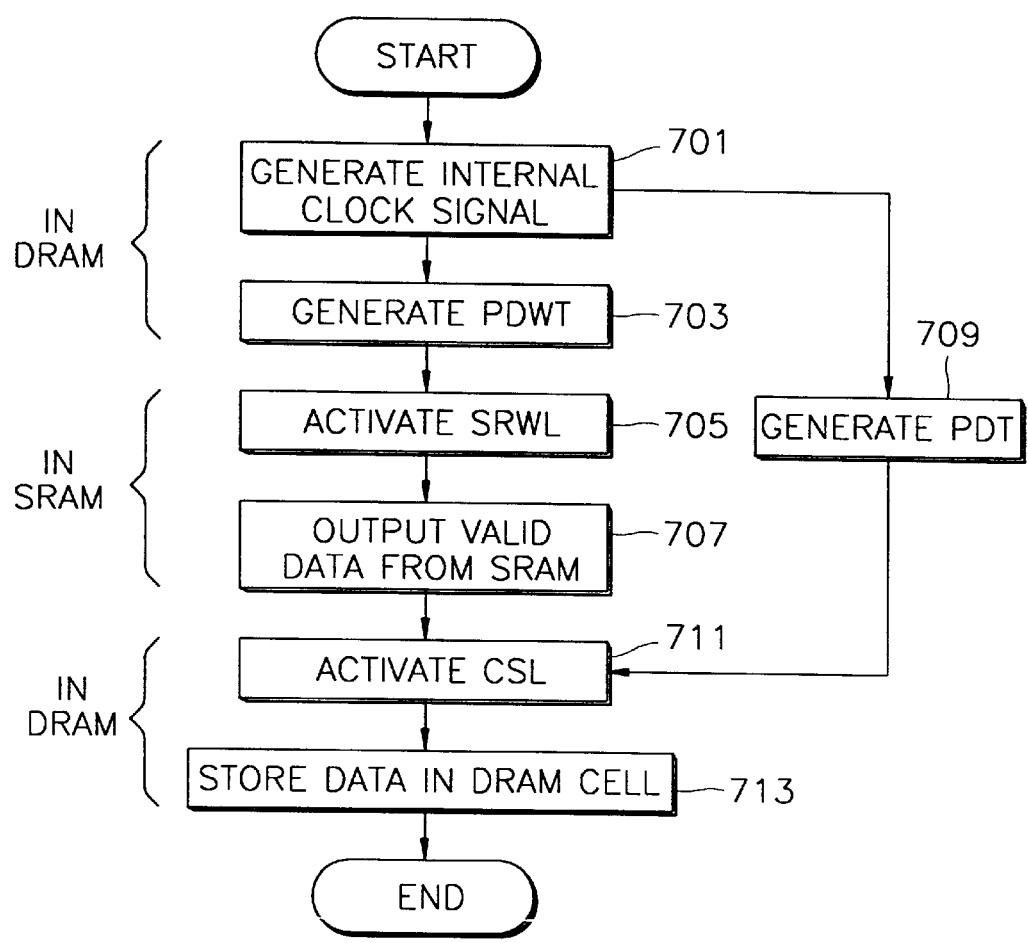
FIG. 7 is a flowchart illustrating a method of performing a DRAM write operation according to an embodiment of the present invention.

FIG. 7 is a flowchart illustrating a method of performing a DRAM write mode according to an embodiment of the present invention, in which data is read from an SRAM and transmitted to a DRAM. The operations of the DRAM and the SRAM in a DRAM write mode will now be described referring to FIG. 7.

First, an internal clock signal PCLK is generated in synchronization with an external clock signal ECLK, in step 701. A DRAM write control signal PDWT for controlling an SRAM read word line SRWL is generated in synchronization with the internal clock signal PCLK, in step 703. The SRAM read word line SRWL is activated in response to the DRAM write control signal PDWT, in step 705. Effective data is output from the SRAM, in step 707. Concurrently with the above steps, the DRAM generates a write signal PDT which responds to the internal clock signal PCLK, in step 709. A column selection signal CSL is activated in response to the write signal PDT, in step 711. Thus, data received from the SRAM via the input buffer 109b and the write driver 107c is transmitted to a pair of bit lines BL and /BL and stored in a memory cell in the DRAM, in step 713.

Although the invention has been described with reference to a particular embodiment, it will be apparent to one of ordinary skill in the art that modifications of the described embodiment may be made without departing from the spirit and scope of the invention.

We claim:

1. A semiconductor device including a DRAM having a plurality of first memory cells which are arranged in rows and columns, a pair of input and output lines for transferring data in a selected one of the first memory cells, an input and output sense amplifier coupled to the pair of input and output lines for amplifying data on pair of input and output lines in a first mode, and a write driver for driving received data to the pair of input and output lines in a second mode; and an SRAM comprising:

a plurality of second memory cells which are arranged in rows and columns, a write bit line for transferring data output from the DRAM in the first mode, a write word line for controlling the data on the write bit line to be transmitted to a selected one of the second memory cells in the first mode, a read word line for controlling data to be read from the selected second memory cell in the second mode, and a read bit line for transmitting the data read from the second memory cell to the DRAM, wherein the reading operation of the DRAM and the writing operation of the SRAM are simultaneously controlled by a first control signal in the first mode, and the reading operation of the SRAM and the writing operation of the DRAM are simultaneously controlled by a second control signal, and wherein the SRAM comprises: a write word line control unit for generating a DRAM read control signal for driving the write word line; and a read word line control unit for generating a DRAM write control signal for driving the read word line.

2. The semiconductor device of claim 1, wherein the write word line control unit comprises:

a logic unit operative in response to receipt of an internal clock signal and latency information to provide an output signal; and a DRAM read control signal generator for generating a DRAM read control signal by delaying the output signal from the logic unit for a predetermined delay time when a CAS latency is less than or equal to a predetermined length, and generating the DRAM read control signal by providing the output signal from the logic unit without a delay time when CAS latency is greater than the predetermined length.

3. The semiconductor device of claim 2, wherein the DRAM read control signal generator comprises:

a delay unit for receiving the output signal from the logic unit and delaying the output signal of the logic unit for the delay time;

a first transfer unit for receiving the output signal from the delay unit and providing the output signal as the DRAM read control signal when CAS latency is less than or equal to the reference length; and a second transfer unit for receiving the output signal from the logic unit and providing the output signal as the DRAM read control signal when CAS latency is greater than the reference length.

4. The semiconductor device of claim 1, wherein the read word line control unit further comprises a logic unit for generating the DRAM write control signal in response to said second control signal.

5. A method of transferring data in a semiconductor device including a DRAM having a plurality of first memory cells which are arranged in rows and columns, a pair of input and output lines for transferring data in a selected one of the first memory cells, and an input and output sense amplifier coupled to the pair of input and output lines for amplifying data on the pair of input and output lines in a first mode; and an SRAM comprising a plurality of second memory cells which are arranged in rows and columns, a write bit line for transferring data which is output from the DRAM in the first mode, and a write word line for controlling the data on the write bit line to be transferred to a selected one of the second memory cells in the first mode, the method comprising:

(a) generating an internal clock signal in a synchronization with an external clock signal;

(b) precharging the input and output lines to the same voltage level, in synchronization with the internal clock signal;

(c) transferring the data on a selected first memory cell to the precharged input and output lines;

(d) sensing and amplifying the data transferred from the first memory cell by enabling the input and output sense amplifier;

(e) outputting the amplified data from the DRAM;

(f) providing a logic unit operative in response to receipt of the internal clock signal and latency information to produce an output signal;

(g) generating a DRAM read control signal by delaying an output signal from said logic unit for a predetermined delay time with respect to the internal clock signal when a CAS latency is less than or equal to a predetermined length; and (h) writing data in the second memory cells in response to the DRAM read control signal and activation of the write word line of the SRAM.

6. A method of transferring data in a semiconductor device including a DRAM having a plurality of first memory cells which are arranged in rows and columns, a pair of input and output lines, and a write driver for driving received data to the pair of input and output lines in a second mode; and an SRAM having a plurality of second memory cells which are arranged in rows and columns, a second word line for controlling data to be read from a selected second memory cell in the first mode, and a read bit line for transferring data which is read from the selected second memory cell to the DRAM, the method comprising:

(a) generating an internal clock signal in a synchronization with an external clock signal;

(b) generating in synchronization with the internal clock signal a DRAM write control signal for controlling the read word line of the SRAM;

(c) activating the read word line of the SRAM in response to the DRAM write control signal;

(d) outputting data from the SRAM;

(e) generating a predetermined write signal in synchronization with the internal clock signal; and (f) storing data which is output from the SRAM in a selected one of the first memory cells via the pair of input and output lines in response to the write signal.

* * * * *